(12) United States Patent
Shanthaveerappa et al.

(10) Patent No.: US 10,733,316 B2
(45) Date of Patent: Aug. 4, 2020

(54) PLUGGABLE DATABASE LOCKDOWN PROFILE

(71) Applicant: Oracle International Corporation, Redwood Shores, CA (US)

(72) Inventors: Prashanth Shanthaveerappa, San Mateo, CA (US); Sanket Jain, Sunnyvale, CA (US); Kumar Rajamani, San Ramon, CA (US); Andre Kruglikov, Atherton, CA (US)

(73) Assignee: Oracle International Corporation, Redwood Shores, CA (US)

( * ) Notice: Subject to any disclaimer, the term of this patent is extended or adjusted under 35 U.S.C. 154(b) by 569 days.

(21) Appl. No.: 15/244,395

(22) Filed: Aug. 23, 2016

(65) Prior Publication Data

US 2017/0116435 A1 Apr. 27, 2017

Related U.S. Application Data

(60) Provisional application No. 62/245,937, filed on Oct. 23, 2015.

(51) Int. Cl.
*G06F 16/21* (2019.01)
*G06F 21/62* (2013.01)
(Continued)

(52) U.S. Cl.
CPC .......... *G06F 21/6227* (2013.01); *G06F 16/21* (2019.01); *G06F 16/2255* (2019.01);
(Continued)

(58) Field of Classification Search
CPC ............. G06F 21/6227; G06F 17/3033; G06F 17/3048; G06F 21/62
(Continued)

(56) References Cited

U.S. PATENT DOCUMENTS 7,010,663 B2 * 3/2006 George ................. G06F 3/0601
711/209
7,493,311 B1 2/2009 Cutsinger et al.
(Continued)

FOREIGN PATENT DOCUMENTS

EP 2 336 886 A2 6/2011
EP 2 767 913 A 8/2014
WO WO 2015/112614 A1 7/2015

OTHER PUBLICATIONS

Garfield Zhiping Wu and Frank Wm. Tompa, "Effective and Efficient Bitmaps for Access Control", Mar. 26-28, 2014, 2014 Data Compression Conference (Year: 2014).*
(Continued)

*Primary Examiner* — Hosain T Alam
*Assistant Examiner* — Robert F May
(74) *Attorney, Agent, or Firm* — Hickman Palermo Becker Bingham LLP

(57) ABSTRACT

Techniques are described herein for allowing a container DBMS to impose restrictions, on a per-pluggable-database basis, on operations based on the pluggable database to which the users that request the operations belong. In one embodiment, lockdown profiles can be created and mapped to pluggable databases. Lockdown profiles specify PDB-wide restrictions on operations. The restrictions may apply to all operations of a given type, may apply to specific features, may require use of specific parameter values, etc. All users that belong to a pluggable database are restricted by the restrictions specified in the lockdown profile to which their pluggable database is mapped, unless the lockdown profile has a user-specific exemption for them. Bitmaps and/or hash tables may be used to more quickly determine, at query runtime, whether a query violates any profile-
(Continued)

specified restrictions. Execution of queries that violate any profile-specified restrictions is prevented.

31 Claims, 4 Drawing Sheets

(51) Int. Cl.
*G06F 16/22* (2019.01)
*G06F 16/2455* (2019.01)
*G06F 21/00* (2013.01)
*G06F 16/25* (2019.01)

(52) U.S. Cl.
CPC ...... *G06F 16/24552* (2019.01); *G06F 16/256* (2019.01); *G06F 21/00* (2013.01); *G06F 21/62* (2013.01)

(58) Field of Classification Search
USPC .......................................................... 707/784
See application file for complete search history.

(56) References Cited

U.S. PATENT DOCUMENTS

| | | | |
|---|---|---|---|
| 8,140,576 B1* | 3/2012 | Viripaeff | G06F 21/6227 707/781 |
| 8,615,528 B2 | 12/2013 | Shah | |
| 2006/0248599 A1 | 11/2006 | Sack | |
| 2007/0294236 A1* | 12/2007 | Vaughan | G06F 16/90339 |
| 2010/0061250 A1 | 3/2010 | Nugent | |
| 2011/0153727 A1* | 6/2011 | Li | G06F 9/5055 709/203 |
| 2011/0258233 A1* | 10/2011 | Unger | G06F 16/24539 707/783 |
| 2012/0173513 A1 | 7/2012 | Agrawal | |
| 2012/0173581 A1 | 7/2012 | Hartig | |
| 2012/0324069 A1 | 12/2012 | Nori | |
| 2013/0046799 A1 | 2/2013 | Hale | |
| 2013/0232463 A1 | 9/2013 | Nagaraja | |
| 2013/0290256 A1* | 10/2013 | Barrall | G06F 21/6218 707/634 |
| 2014/0006367 A1 | 1/2014 | Hills | |
| 2014/0040999 A1 | 2/2014 | Zhang | |
| 2014/0075027 A1 | 3/2014 | Chatterjee | |
| 2014/0095530 A1* | 4/2014 | Lee | G06F 11/1471 707/769 |
| 2014/0280961 A1 | 9/2014 | Martinez | |
| 2015/0058376 A1 | 2/2015 | Soshin | |
| 2015/0089571 A1* | 3/2015 | Srinivasan | H04L 63/102 726/1 |
| 2015/0095343 A1 | 4/2015 | Divilly et al. | |
| 2015/0095796 A1 | 4/2015 | Kutz et al. | |
| 2015/0095973 A1 | 4/2015 | Neumueller et al. | |
| 2015/0295781 A1 | 10/2015 | Maes | |
| 2015/0347050 A1* | 12/2015 | Xie | G06F 3/0622 711/163 |
| 2016/0105442 A1* | 4/2016 | Movida | H04L 63/102 726/28 |

OTHER PUBLICATIONS

Anita Mukundan: "Inside OCP: Basics of the Multitenant Container Database", Oracle Magazine, dated Sep. 14, 2014, 3 pages.
Securosis, "Understanding and Selecting a Database Security Platform," Version 2, dated May 15, 2012, pp. 1-34.
Oracle, "Effective Resources Management Using Oracle DB Resource Manager", An Oracle White Paper, dated Jun. 2011, 1-24 pages.
Oracle 9i, "Privileges, Roles and Security Policies, Database Concepts", Release 2 (9.2), Dated Nov. 28, 2011, pp. 1-8.

* cited by examiner

PLUGGABLE DATABASE LOCKDOWN PROFILE

CROSS-REFERENCE TO RELATED APPLICATIONS; BENEFIT CLAIM

This application claims the benefit of Provisional Appln. 62/245,937, filed Oct. 23, 2015, the entire contents of which is hereby incorporated by reference as if fully set forth herein, under 35 U.S.C. § 119.

FIELD OF THE INVENTION

The present invention relates to database systems and, more specifically, to restricting operations based on the pluggable database from which the operations originate.

BACKGROUND

Database consolidation involves distributing and sharing computer resources of a hardware platform among multiple databases. Techniques have been developed, for example, where multiple distinct "pluggable databases" can be contained in a single "container database". Such techniques are described, for example, in U.S. patent application Ser. No. 14/202,091, filed Mar. 10, 2014, the entire contents of which are incorporated herein.

The container database is managed by a container database management system ("container DBMS"). Each pluggable database within the container database is defined by its own separate database dictionary and is isolated to an extent from other pluggable databases within the container database.

Unfortunately, even though the container DBMS may be aware of the separation between the pluggable databases that it manages, entities external to the container DBMS do not share this awareness. For example, in the interactions between the container DBMS and the operating system and network, the container DBMS may appear to be a single monolithic entity. Thus, the operating system has no way to determine the specific pluggable database involved with any given request for OS resources made by the container DBMS. Similarly, network software has no way to determine the specific pluggable database involved with any given network communication between the container DBMS and other systems.

In addition, security issues may arise when a local user of a pluggable database performs an operation that affects a commonly shared user schema, or affects the entire container database. Finally, there is currently no ability to set database options on a per-pluggable-database basis. Instead, the database options of the container database govern all pluggable databases contained therein.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1A:
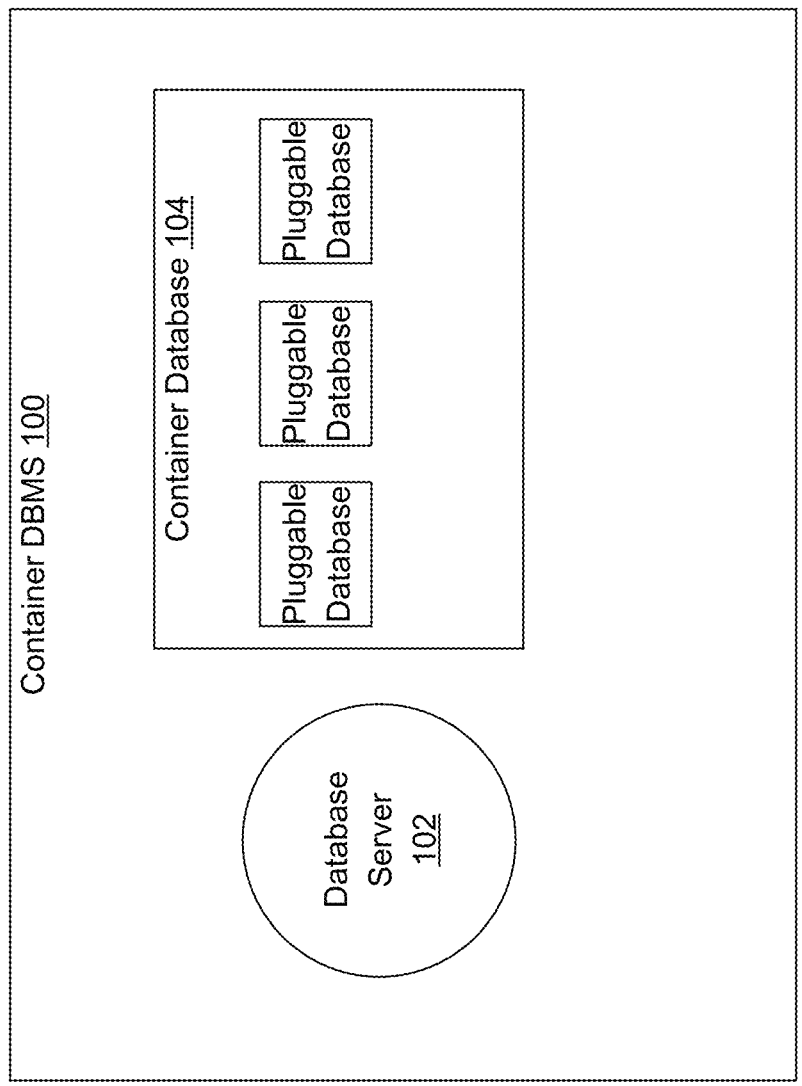
FIG. 1A is a diagram depicting a container DBMS, according to an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Database System Overview

Embodiments of the present invention are used in the context of DBMSs. Therefore, a description of a DBMS is useful.

A DBMS manages one or more databases. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement that conforms to a database language. A database language for expressing the database commands is the Structured Query Language (SQL). There are many different versions of SQL, some versions are standard and some proprietary, and there are a variety of extensions. Data definition language ("DDL") commands are issued to a database server to create or configure database objects, such as tables, views, or complex data types. SQL/XML is a common extension of SQL used when manipulating XML data in an object-relational database.

A multi-node database management system is made up of interconnected nodes that share access to the same database or databases. Typically, the nodes are interconnected via a network and share access, in varying degrees, to shared storage, e.g. shared access to a set of disk drives and data blocks stored thereon. The varying degrees of shared access between the nodes may include shared nothing, shared everything, exclusive access to database partitions by node, or some combination thereof. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

General Overview of Pluggable Database
Lockdown Profiles

Because individual pluggable databases cannot be distinguished at the operating system or network level, the operating system and network software cannot be relied on to enforce per-pluggable-database restrictions. Therefore, techniques are described herein for allowing the container DBMS to impose restrictions, on a per-pluggable-database basis, on operations that result in interaction with the operating system and/or network.

Specifically, techniques are described hereafter for implementing pluggable database lockdown profiles ("lockdown profiles"). According to one embodiment, lockdown profiles reside in the container database ROOT and can only be created and altered in ROOT. In one implementation, a lockdown profile specifies a set of negative privileges to restrict operations on a pluggable database basis.

For example, in one embodiment, the lockdown profile for a given pluggable database may specify restrictions for:
  Operations where identity is shared between pluggable databases
    at OS level when database interacts with OS resources like files or processes.
    at network level when the database communicates with other systems.
  Operations of a pluggable database local user affecting common user's schema in the container database.
  Operations related to database options.
  Operations at SQL statement level that can affect other pluggable databases and in turn affect the container database as a whole.

Because these restrictions are enforced within the container DBMS, which is aware of the distinct pluggable databases, per-pluggable-database security measures are possible even though the operating system and network remain unaware of the pluggable database associated with OS requests and network communications made by the container DBMS.

Container Database Management System

FIG. 1A depicts an example DBMS 100 upon which an embodiment may be implemented. Referring to FIG. 1A, container DBMS 100 comprises Database Server 102 and Container Database 104. Container Database 104, in turn, contains multiple pluggable databases. Database Server 102 manages Container Database 104 and the pluggable databases contained in Container Database 104.

Database Server 102 represents a combination of software and resources on one or more computer systems that manage Container Database 104. An example of a database server and computer system upon which a database server may run is described above in the section DATABASE SYSTEM OVERVIEW, although an embodiment of the present invention is not so limited. Although FIG. 1A only depicts a particular number of each element, an embodiment may have many more of each of the elements illustrated in FIG. 1A.

Figure 1B:
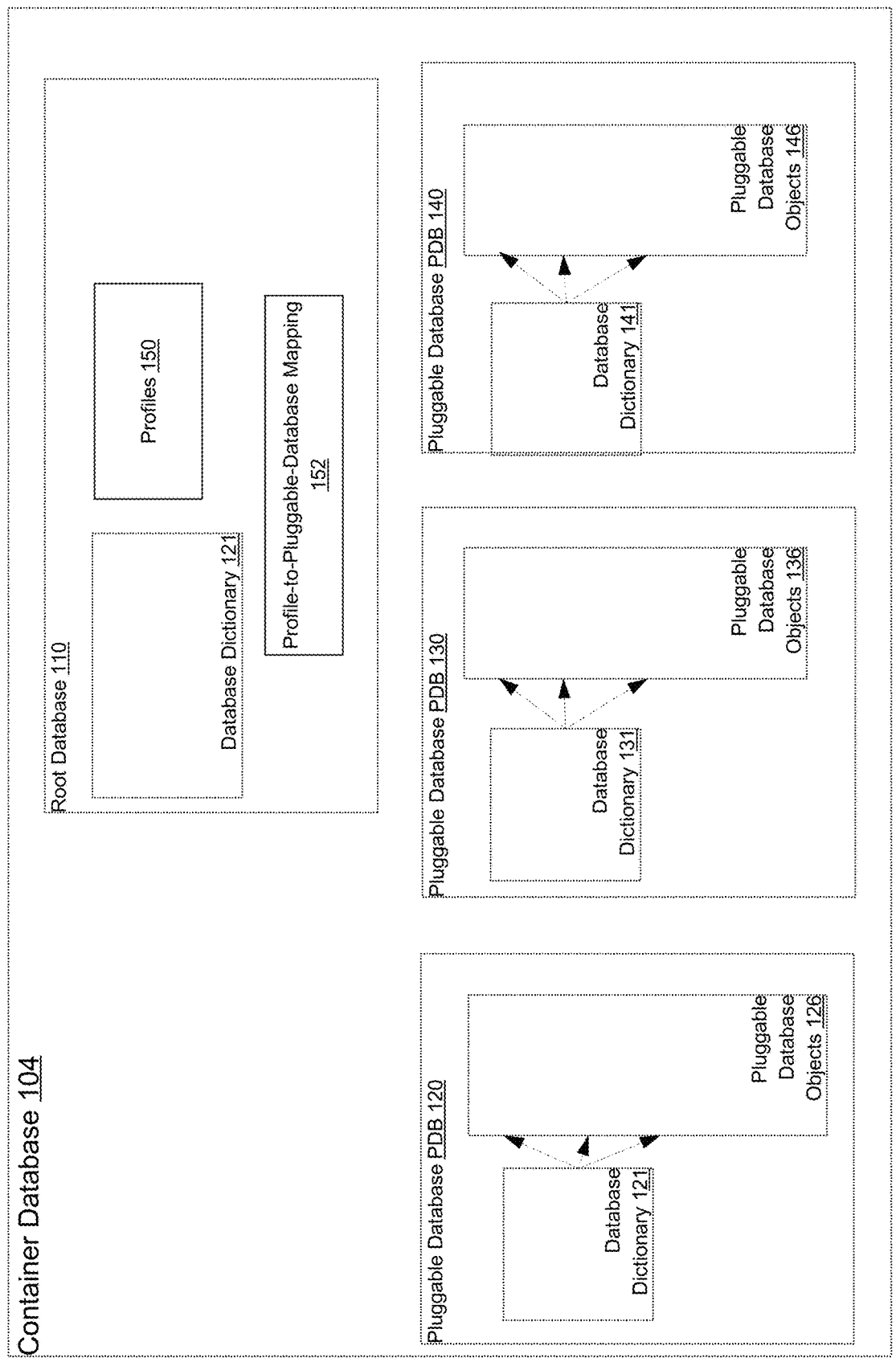
FIG. 1B is a diagram depicting the container database of FIG. 1A in greater detail, according to an embodiment.

FIG. 1B depicts a more detailed view of Container Database 104 according to an embodiment of the present invention. Container Database 104 contains multiple databases that are hosted and managed by Database Server 102. The databases include Pluggable Database PDB 120, Pluggable Database PDB 130, Pluggable Database PDB 140, and Root Database 110. Root Database 110 is a database that is used by Database Server 102 to globally manage Container Database 104, and to store metadata that defines pluggable databases and/or that defines "common database objects" that are accessible to users of multiple pluggable databases.

Each pluggable database includes its own database dictionary and database objects. In the system illustrated in FIG. 1B, Pluggable Database PDB 120 includes Database Dictionary 121 and databased objects 126, Pluggable Database PDB 130 includes Database Dictionary 131 and database objects 136, and Pluggable Database PDB 140 includes Database Dictionary 141 and database objects 146. Similar to pluggable databases, Root Database 110 includes Database Dictionary 111. Database Dictionary 111 contains metadata that defines various aspects of Container Database 104 needed to administer Container Database 104 and the pluggable databases contained therein, including metadata that defines Pluggable Database PDB 120, Pluggable Database PDB 130, and Pluggable Database PDB 140.

Root database 110 also includes lockdown profiles 150 and a profile-to-pluggable-database mapping 152. As explained above, each profile in lockdown profiles 150 specifies a set of negative privileges to restrict operations at the pluggable database level. Profile-to-pluggable-database mapping 152 generally represents metadata to indicates which profiles correspond to which pluggable database. For example, if a profile X is mapped only to a pluggable database Y, then the restrictions specified in profile X only restrict operations that are initiated on behalf of a user of pluggable database Y.

While profiles 150 and mapping 152 are illustrated as being maintained separate from dictionary 121 of ROOT database 110, in alternative embodiment, one or both of profiles 150 and mapping 152 may be maintained within database dictionary 121.

User-Specific Privilege Grants

It is common for database systems to support user-specific privilege grants. For example, a database administrator may be given grants to perform a significantly wider range of operations than a typical database user. Such privileges are typically granted positively. That is, the grants bestowed on a user indicate what the user can do, as opposed to what the user cannot do.

Granting a privilege to a user of a pluggable database may involve:
  An administrative user of the container database creating the pluggable database within the container database and creating an administrative user for the pluggable database.

The administrative user for the pluggable database creating another user for the pluggable database and granting that other user specific privileges.

The specific privileges granted that other user may allow that other user to grant privileges to yet other users of the pluggable database.

Significantly, these privileges are positively-granted, and the grants are made on a per-user basis. In some cases, positive privileges may be granted to "public", meaning that everyone has the privilege in question.

As mentioned above, security issues may arise when hardware is shared among a plurality of pluggable databases. For example, while it may be okay for the user of a pluggable database (e.g. PDB 120) to modify database objects in the pluggable database to which the user belongs (e.g. objects 126), it may be undesirable to allow that same user to modify "common database objects" that are shared between the pluggable databases (e.g. objects in root database 110). On the other hand, it may be desirable for all users of PDB 130 to modify those common database objects. Consequently, the techniques described herein involve providing lockdown profiles for use in conjunction with the user-specific privilege grants. As shall be explained hereafter, lockdown profiles effectively take away from users some of the privileges that the users have been granted, where the privileges that are taken away are based on the pluggable database to which the users belong.

PDB-Wide Privilege Restrictions

As mentioned above, lockdown profiles establish PDB-wide privilege restrictions. Specifically, to restrict al users of PDB 120 from performing a particular type of operation, a lockdown profile is created in the ROOT database 110, and an entry is inserted into the lockdown profile to indicate the particular type of operation that is restricted. The Profile-to-Pluggable-Database mapping 152 is then updated to associate the lockdown profile with PDB 120. From that point, whenever a user of PDB 120 requests database server 102 to perform an operation for which the user has been granted a privilege, database server 102 determines that the user belongs to pluggable database 120, determines (based on mapping 152) the profile or profiles that map to pluggable database 120, and then determines whether the requested operation would violate any restrictions specified in those profiles. If the operation would violate any restrictions in those profiles, then the operation is prevented and database server 102 may return an appropriate error message. On the other hand, if the operation would not violate any restrictions, then database server 102 performs the operation.

Types of Features that May be Secured Using PDL Profiles

As mentioned above, sharing an identity raises security issues when the individuals using the shared identities are different and may have different aims or allegiances. Within a container DBMS, identity can be shared:
  at the OS level when the database interacts with OS resources likes files or processes,
  at a network level when the database communicates with other systems and network identity is important, or
  inside the database, as PDBs access or create common objects or communicate across container boundaries using features like Database Links.
The features that use these identities can be divided into:
  network access features, i.e. operations which use the network to communicate outside the PDB
  system access features, i.e. operations which access the host operating system
  file access features, i.e. operations which access files or directories
  common user or object access, i.e. operation where a local user in the PDB can proxy through common user or access objects in common schema
  administrative features, i.e. operations which are used to administer certain database options like XDB, Advanced Queuing, Context.
  connection features, e.g.—lockdown profiles can be used to (a) block common user connections to the PDB, (b) block local SYSOPER connections to a PDB in restricted mode, etc.

These are merely examples of the types of features that lockdown profiles may be used to secure. Some embodiments may use lockdown profiles to secure features that fall outside the categories listed above. Thus, lockdown profiles are not limited to securing any particular set or types of features.

Many of these features listed above are categories into which multiple operations belong. According to one embodiment, lockdown profiles may specify restrictions at various levels of granularity. For example, a lockdown profile may restrict an entire feature, or may indicate which specific operations associated with that feature are restricted.

Creating and Dropping a Lockdown Profile

In order to use a lockdown profile to impose restrictions on operations performed by users of a particular pluggable database, a lockdown profile must first be created. According to one embodiment, the syntax of a database command to create a lockdown profile is:
  CREATE LOCKDOWN PROFILE <profile_name>;
  In response to receipt of such a command, a lockdown Profile <profile_name> will be created by the container DBMS.
  An example use of such a command is:
  SQL > create lockdown profile p1;
  According to one embodiment, the syntax of a database command to drop a lockdown profile is:
  DROP LOCKDOWN PROFILE <profile_name>;
  In response to receipt of such a command, the specified profile <profile_name> will be dropped by the container DBMS, mappings between the profile and any PDB will be deleted, and any PDB to which the newly dropped PDB Lockdown Profile was assigned will no longer be restricted by the restrictions that were specified in the dropped profile.
  An example use of such a command is:
  SQL > drop lockdown profile p1;
  In one embodiment, these commands are only performed by the container DBMS 100 for users that (a) are connected to the container database (Root database 110), and (b) that have been granted the privileges for performing these commands.

Adding Restrictions to a PDL Profile

After a lockdown profile is created, restrictions are added to the profile to prohibit, on a pluggable-database-wide basis, certain operations. According to one embodiment, lockdown profiles are altered to include negative privileges (Rules) using the following commands:
  For specifying a statement-based rule:

SQL > Alter lockdown profile <profile_name> disable statement=('Statement name') clause=('clause name') option=('option name');

An example of how this syntax may be used is:

alter lockdown profile p1 disable statement=('ALTER SYSTEM') clause=('SET') option=('CURSOR_SHARING');

For specifying a feature rule:

SQL > alter lockdown profile <profile_name> disable feature=('feature name');

An example of how this syntax may be used is:

SQL > alter lockdown profile p1 disable feature=('NETWORK_ACCESS');

For specifying an option rule:

SQL > alter lockdown profile <profile_name> disable option=('option name');

An example of how this syntax may be used is:

SQL > alter lockdown profile p1 disable option=('Database Queuing');

Creating a Profile-to-PDB Mapping

Once a lockdown profile has been created, the lockdown profile may be mapped to one or more pluggable databases to indicate that the restrictions specified in the lockdown profile are to be applied to users of those one or more pluggable databases. According to one embodiment, a lockdown profile is mapped to a particular pluggable database by an administrative user of the container database. Specifically, in one embodiment, the administrative user of the container database assigns a lockdown profile to a pluggable database by (a) connecting to the pluggable database, and (b) setting the parameter pdb_lockdown to the name of the desired profile.

In alternative embodiments, profile-to-PDB mappings may be established without first connecting to the pluggable database to which the lockdown profile is to be assigned. For example, in such an alternative embodiment, an administrative user connected to container database 104 may map a lockdown profile to PDB 120 without first connecting to PDB 120.

In one embodiment, the syntax of the command to create a profile-to-PDB mapping is:

SQL > alter system set pdb_lockdown='<profile_name>';

In response to receipt of such a command, a profile-to-PDB mapping is stored in the container database. For example, in response to the command being issued by a container database administrative user connected to PDB 120, an entry that maps the specified profile to PDB 120 would be added to the profile-to-PDB mapping 152 stored in root database 110. An example of how this syntax may be used is:

SQL > alter system set pdb_lockdown='p1';

After setting the profile, all the rules take effect and the operations listed in the profile will be restricted (lockdown) in the specified pluggable database. It should be noted that the syntax of all commands relating to lockdown profiles may vary from implementation to implementation. Thus, the techniques described herein are not limited to any particular command syntax.

System-Provided PDL Profiles

According to one embodiment, the developer of database server 102 may provide lockdown profiles for common PDB scenarios. These system-provided lockdown profiles may be used instead of, or in conjunction with, one or more user-created lockdown profiles. In an embodiment that includes system-provided lockdown profiles, the system-provided lockdown profiles may be included in profiles 150 when database server 102 is originally installed. However, profile-to-PDB mapping 152 would not initially map those system-provided lockdown profiles to any PDBs.

Once PDBs are created, mappings between the PDBs and the system-provided lockdown profiles may be created in the same manner as described above relative to user-created lockdown profiles. According to one embodiment, operations, options, and features may be added or removed from system-provided lockdown profiles in the same manner as with user-created lockdown profiles. However, in one embodiment, for system-provided lockdown profiles, only operations which were added by a customer may be removed by the customer, i.e. restrictions imposed in these profiles by the database developer cannot be lifted.

Enforcing Restrictions Specified in Lockdown Profiles

According to one embodiment, database server 102 makes two checks before the database server 102 executes an operation specified in a query that was issued by a user associated with a PDB. Specifically, database server 102 makes a compile-time check to determine whether the user that submitted the query has been granted the privileges necessary to perform the operation specified in the query. Database server 102 generates an error if the user that submitted the query does not have the privileges necessary to perform the operation specified in the query. Otherwise, database server 102 compiles the query.

After compiling the query and before executing the query, database server 102 performs a run-time check to whether the operation specified in the query would violate a restriction specified in an applicable lockdown profile. Database server 102 generates an error if the operation specified in the query would violate a restriction specified in an applicable lockdown profile. Otherwise, database server 102 compiles the query.

According to one embodiment, the runtime check includes:

Determining whether the operation specified in the query is a type of operation that can be restricted in a lockdown profile If so, then inspecting the profile-to-PDB mapping 152 to determine whether the PDB of the user submitting the query is mapped to any lockdown profile.

If so, then loading, into volatile memory, restriction-identifying information that identifies the restrictions specified in the lockdown profiles 150 to which the PDB of the user is mapped.

The database server then determines, based on the restriction-identifying information, whether the operation specified in the query is restricted.

If the operation specified in the query is restricted, then an error message is generated. Otherwise, the database server 102 executes the query to perform the operation.

Efficiently Determining Whether a SQL Command Type is Restricted

Various enhancements may be employed to speed up the process of determining whether an operation is restricted based on the restriction-identifying information. For example, assume that a lockdown profile restricts the use of particular types of SQL commands. Most database systems support a relatively small number of types of SQL commands. Therefore, the SQL command restrictions that are specified in a lockdown profile may be represented by a restricted-command bitmap, where each bit position corresponds to a different type of SQL command, and the value of each bit indicates whether the SQL command type to which the bit corresponds is restricted.

Restricted-command bitmaps may be stored directly within lockdown profiles 150. However, in one embodiment, the lockdown profiles 150 specify the restricted SQL commands in a human-readable text format. In such an embodiment, loading the restriction-identifying information into volatile memory involves reading the textual indications of the restricted SQL commands and generating, based on the textual indications, a restricted-command bitmap.

In an embodiment that employs restricted-command bitmaps, the process of determining whether the SQL command requested by a PDB user is restricted merely involves reading the value at the position, within the restricted-command bitmap, that corresponds to the type of SQL command specified in the user's query. In the case where the PDB maps to multiple lockdown profiles, the restricted-command bitmaps of the various profiles may be OR'ed together to create a composite restricted-command bitmap, where the restriction determination is by the value of the bit at the relevant location in the composite restricted-command bitmap.

Efficiently Determining Whether a Feature is Restricted lockdown profiles may be used to restrict uses of a PDB from using certain features. The features that may be subject to restrictions may not correspond to types of SQL statements. For example, the features that are subject to restrictions may be PL/SQL procedures, certain views, certain parameters, etc. Similar to restricted SQL command types, these restricted features may be represented within lockdown profiles with human-readable text. In such an embodiment, the database server 102 could perform string comparisons at query runtime to determine whether a query-specified feature matches a profile-restricted feature. However, performing such string comparisons in response to every query is relatively inefficient.

In an alternative embodiment, rather than perform such string comparisons at query runtime, loading the restriction-identifying information into volatile memory involves building a hash table in volatile memory. Specifically, the textual representation of each restricted feature may be fed to a hash function to generate a hash value. The hash values thus produced are then used as indexes to locate entries in a hash table. The entries indicated by the hash values are updated to indicate that the features that hashed to those entries are restricted.

Once the hash table is built and populated, the hash table may be used to quickly determine whether an incoming query refers to a restricted feature by:
  Applying the hash function to a feature specified in the incoming query to generate a hash value
  Locating the entry in the hash table that corresponds to the hash value
  Determining whether the feature specified in the incoming query is restricted based on the contents of the entry

Default Settings for Features

In addition to or instead of specifying features that users of a PDB cannot use, a lockdown profile may specify default values for features. For example, a lockdown profile may indicate that a certain type of SQL command must always include a particular parameter value. When such restrictions are present in a lockdown profile, the database server 102 first checks whether the incoming query makes use of any feature for which a default setting has been specified. If such a feature is being used, then the database server 102 checks to see if the query specifies the default setting of the feature. If not, then execution of the query is denied and an error message is generated.

OS User Restrictions

In many database systems, database commands may cause the database server to invoke a script or routine that is external to the DBMS system. Such invocations are made through the operating system. However, the operating system has little awareness of the source of the call other than the identity of the operating system user from which the call originated. Thus, when a command issued by a user of PDB 120 causes database server 102 to invoke a script that is external to DBMS 100, the operating system only know the OS user-id that database server 102 uses to invoke the script.

According to one embodiment, lockdown profiles may be used to indicate, at the OS level, the PDB associated with external calls made by database server 102. Specifically, the lockdown profile associated with each PDB 120, 130 and 140 may specify a distinct OS user-id. For example, the lockdown profiles associated with PDBs 120, 130 and 140 may specify USER1, USER2 and USER3, respectively. When database server 102 invokes any external routine in response to a command issued by a user of PDB 120, database server 102 invokes the routine as OS USER1. Similarly, when database server 102 invokes any external routine in response to a command issued by a user of PDB 130, database server 102 invokes the routine as OS USER2.

Because the administrative user knows that external calls made on behalf of users of PDB 120 will be associated with OS USER1, the administrative user may establish OS restrictions on a per-OS-user basis. Since each OS user corresponds to a PDB, such OS restrictions will be applied on a PDB-wide basis.

Path Restrictions

In many database systems, database commands may cause the database server to create files external to the DBMS. According to one embodiment, lockdown profiles may be used to restrict where user are able to create such files. Specifically, in one embodiment, the lockdown profile that is associated with a PDB may specify a path prefix, such as /home/user/pdb1/. If such a prefix is specified in the lockdown profile of any PDB, the database server 102 prevents commands issued by users of the PDB from creating files anywhere within the file system other than the directory/home/user/pdb1/and directories that descend therefrom. Such restrictions may be enforced by causing database server 102 to prepend/home/user/pdb1/ to every path specified in commands from users of the PDB, or by raising an error when such commands include paths that do not comply with the restriction.

Common Object Restrictions lockdown profiles may be used to impose restrictions on "common objects". Common objects are objects that are shared among the PDBs in a container DBMS. There are two types of common objects: metadata-shared objects, and data-shared objects. In metadata-shared objects, only the metadata of the object is shared among the PDBs. The actual data with which a metadata-shared object is populated is PDB-specific. For example, the definition of a metadata-shared table T1 may be shared among PDBs 120, 130 and 140. However, the data inserted into table T1 by users of PDB 120 is only visible to users of PDB 120. Similarly, the data inserted into table T1 by users of PDB 130 is only visible to users of PDB 130.

Data-shared objects are objects in which both the metadata and the data of the objects are shared among the PDBs. For example, the definition of a data-shared table T2 may be shared among PDBs 120, 130 and 140. All data contained in table T2 is visible to users of all PDBs 120, 130, and 140.

Because common objects are shared among PDBs, access to the common objects involves additional security issues. Therefore, according to one embodiment, restrictions specified in a lockdown profile may be marked as common-object-specific. A restriction that is marked as common-object-specific is only enforced by database server 102 against operations that involve common objects. A restriction that is not marked as common-object-specific is enforced without regard to whether the operation involves a common object.

For example, assume that a lockdown profile has the restriction that specifies parameter X must be used when command Y is issued against a common object. Under these circumstances, database server will allow command Y to be issued against PDB-specific objects regardless of whether parameter X is used. However, if command Y is used against a common object, then database server 102 would prevent execution of the command if parameter X is not present.

In one embodiment, lockdown profiles may specify, on a restriction-by-restriction basis, the types of objects to which each restriction applies. For example, a restriction may apply to all objects, only to metadata-shared objects, only to data-shared objects, only to common objects, etc. lockdown profiles may also specify that all operations are restricted on a certain class of object, or on certain objects. For example, a lockdown profile may specify that no operations may reference data-shared objects, or the no operations may reference a specific data-shared object.

Network Access Restrictions

In response to user queries, database server 102 may invoke routines (e.g. PL/SQL packages) that provide network access. Network access may be prevented, on a PDB-wide basis, by adding a network-access restriction to the lockdown profile associated with a given PDB. The network-access restriction may restrict access to all such routines, or only some of the routines. For example, a network-access restriction may prevent invocation of the routine used for TCP messaging, but not prevent invocation of the routine used for HTTP messaging. Thus, the lockdown profile associated with PDB 120 may prevent all network access, the lockdown profile associated with PDB 130 may prevent network access using HTTP, and the lockdown profile associated with PDB 140 may not have any network access restrictions at all.

User-Specific Exemptions

According to one embodiment, a lockdown profile may identify specific users that are exempt from some or all of the restrictions contained in the lockdown profile. Thus, if the administrative user of container database 104 is confident that userX of PDB 120 is not a security risk, then the administrative user may store an indication in the lockdown profile associated with PDB 120 that userX is exempt from some or all of the restrictions contained in the lockdown profile. The scope of a user-specific exemption may be global (i.e. userX may do anything permitted by his/her privileged), or restriction specific (e.g. userX is exempt from the restriction that prohibits feature Y).

Caching the Restrictions

While it is possible to generate the restriction-indicating information for a lockdown profile every time a query is executed for a user that is associated with a PDB that maps to that lockdown profile, doing so may be inefficient. In particular, when the restriction-indicating information includes structures, such as hash tables and/or bitmaps, that are generated based on textual information in the lockdown profiles, the performance benefit gained from using such structures may be outweighed by the performance penalty suffered by having to regenerate the structures for each applicable query.

According to one embodiment, to reduce the per-query overhead of creating such access structures, the restriction-indicating information for a lockdown profile is retained in volatile memory after the query for which it was generated has completed. Such restriction-indicating information may remain cached in the volatile memory until either (a) the memory needs to be used for some other purpose, or (b) the corresponding lockdown profile is updated.

In an embodiment that caches the restriction-indicating information of lockdown profiles, the cached restriction-indicating information of a lockdown profile becomes stale when any change is made to the lockdown profile. Stale restriction-indicating information cannot be used because the removal and/or addition of restrictions should be enforced by the database server immediately. Therefore, in one embodiment, any change to a lockdown profile causes the database server to mark as invalid the cached restriction-indicating information for the lockdown profile. In response to a query issued by a user associated with a PDB that maps to the lockdown profile, the database server determines whether the cached restriction-indicating information for the lockdown profile is invalid. If not, then the cached restriction-indicating information is used to determine whether the operations specified in the query are restricted. If the cached restriction-indicating information is invalid, then the restriction-indicating information for the lockdown profile is reconstructed based on the updated lockdown profile.

In an alternative embodiment, rather than marking restrictions as invalid when they become stale, changes to lockdown profiles are immediately propagated to the cached restriction-indicating information. By immediately and dynamically updating the cached restriction-indicating information in response to lockdown profile changes, the cached restriction-indicating information is never stale.

Query Processing Example

Figure 2:
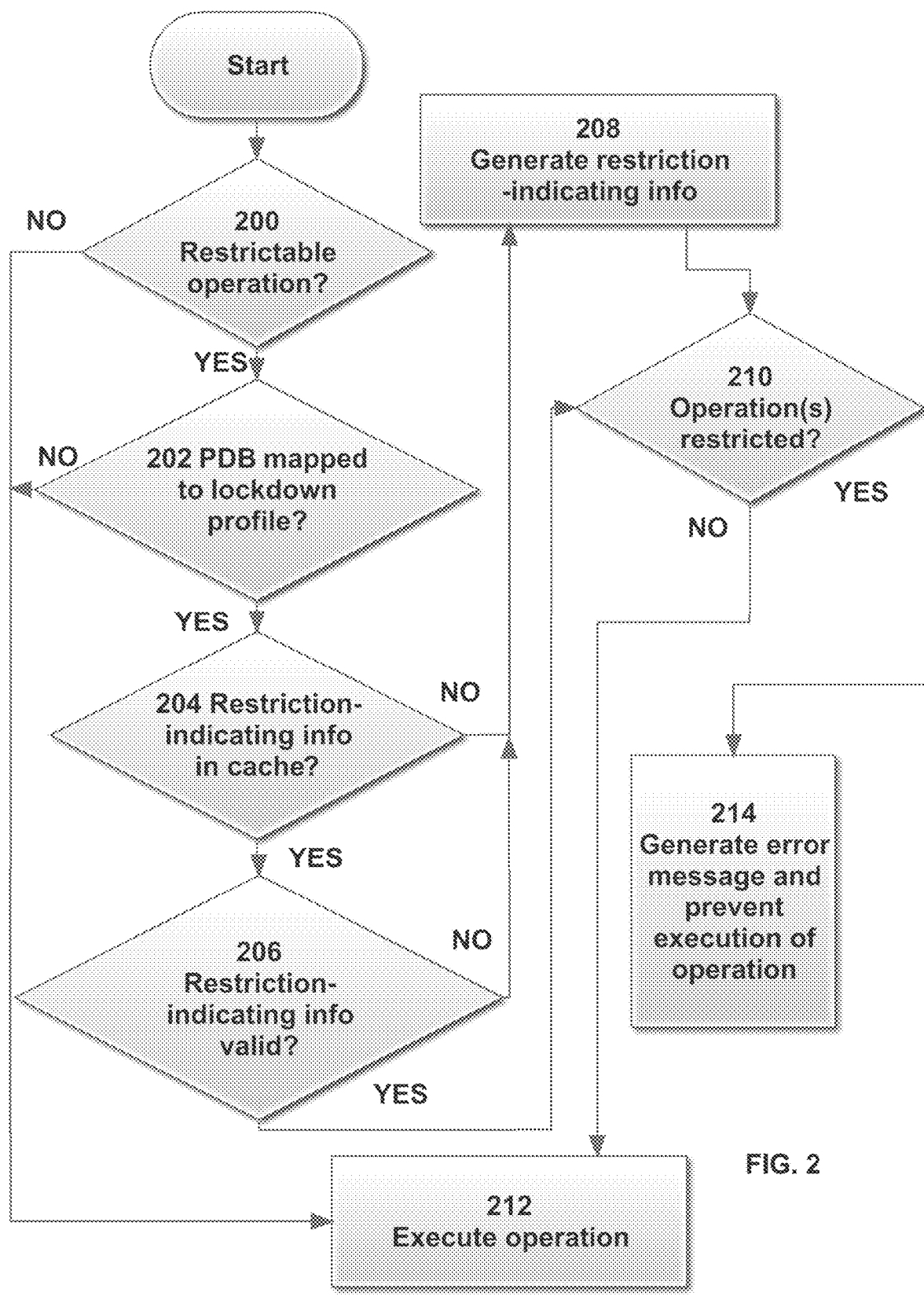
FIG. 2 is a flowchart illustrating steps for performing a runtime check for PDB-wide restrictions on a query, according to an embodiment.

Referring to FIG. 2, it is a flowchart that indicates steps involved in performing the runtime check, according to one embodiment. As mentioned above, the runtime check is performed after the compile-time check has already confirmed that the user that issued the query has the privileges necessary to perform the operations required by the query.

For the purpose of explanation, it shall be assumed that the query at issue is received from a user associated with PDB 120.

At step 200, database server 102 determines whether the operation specified in the query is a type of operation that can be restricted in a lockdown profile. If not, control passes to step 212. Otherwise, control passes to step 202.

At step 202, database server 102 inspects the profile-to-PDB mapping 152 to determine whether the PDB of the user submitting the query is mapped to any lockdown profile. If not, then control passes to step 212. Otherwise, control passes to step 204.

At step 204, database server 102 determines whether the restriction-indicating information for the PDB of the user already resides in cache. If so, then control passes to step 206, otherwise, control passes to step 208. At step 206, database server 102 determines whether the cached restriction-indicating information is valid. If so, then control passes to step 210. Otherwise, control proceeds to step 208.

At step 208, database server 102 loads into volatile memory, restriction-identifying information that identifies the restrictions specified in the lockdown profiles 150 to which the PDB of the user is mapped. As mentioned above, loading the restriction-identifying information may involve generating one or more restricted-command bitmaps and/or generating one or more restricted-feature hash tables. Control then passes to step 210.

At step 210, database server 102 determines, based on the restriction-identifying information, whether any of the operations/features specified in the query are restricted. As mentioned above, this step may involve accounting for user-specific exemptions, common object restrictions, required parameter values, the paths of any files created by the operations, etc. If none of the operations/features specified in the query are restricted, then control passes to step 212, where the query is executed. Otherwise, control passes to step 214 where an error message is generated without executing the query.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
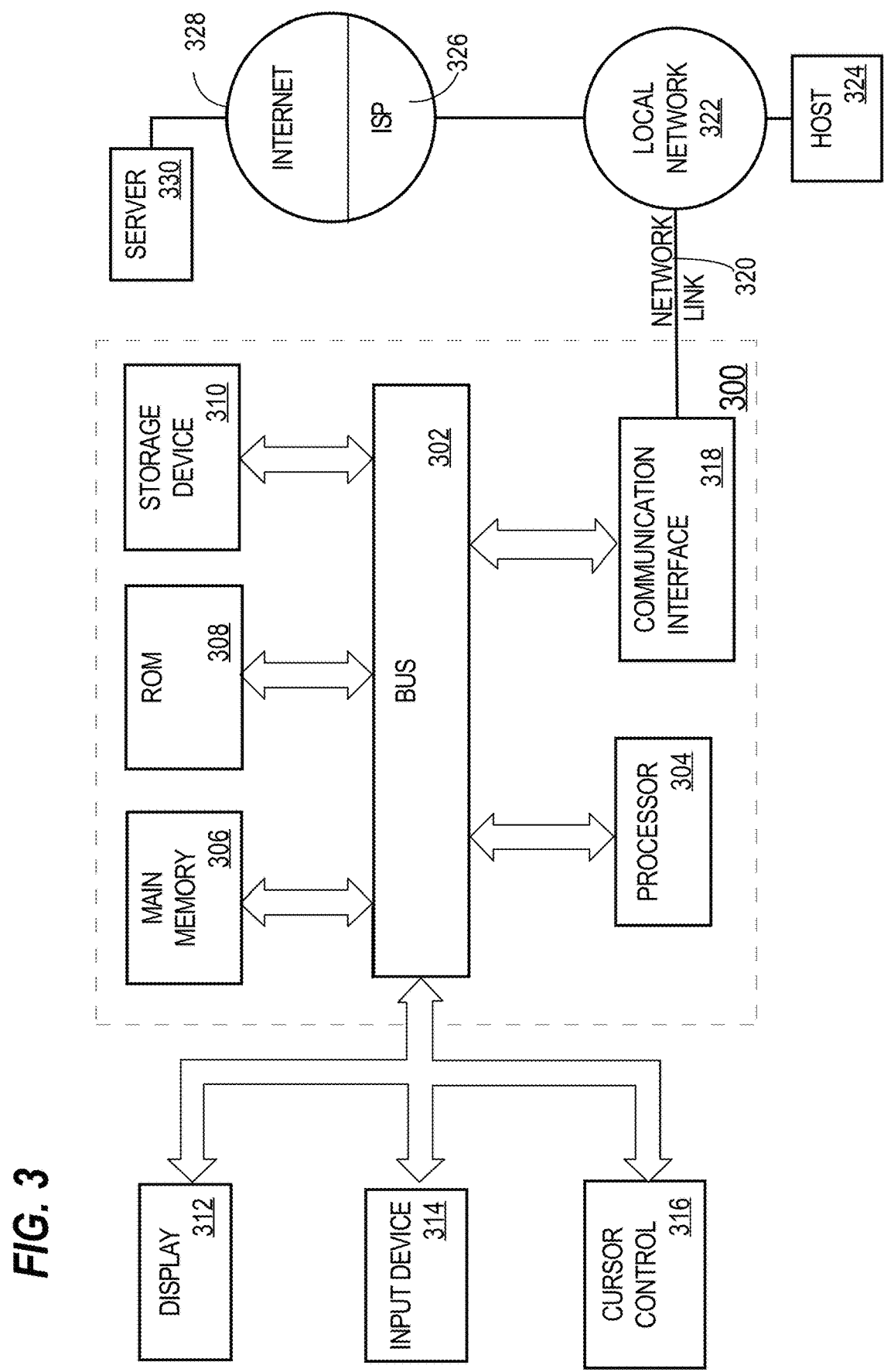
FIG. 3 is a block diagram of a computer system upon which the techniques described herein may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
  sharing hardware resources between a plurality of pluggable databases, each of which is contained in a container database managed by a container DBMS, wherein the plurality of pluggable databases have respective transportable collections of database dictionaries;
  storing one or more profiles in a root database of the container database, wherein the root database is not one of the plurality of pluggable databases;
  wherein each profile of the one or more profiles specifies a corresponding set of restrictions;
  wherein the set of restrictions that correspond to each profile includes access restrictions that apply to any pluggable databases that are mapped to the profile;
  wherein a particular profile of the one or more profiles includes a particular restriction that is one of:
    a first restriction that prohibits users of any pluggable database that is mapped to the particular profile from performing a particular interaction that would result in interaction between the container DBMS and an operating system;
    a second restriction that prohibits users of any pluggable database that is mapped to the particular profile from performing a particular interaction with a network; or
    a third restriction that prohibits users of any pluggable database that is mapped to the particular profile from performing a particular interaction that may affect a shared schema in the container database;
  storing profile-to-pluggable-database mapping information in the root database;
  wherein the profile-to-pluggable-database mapping information maps a particular pluggable database of the plurality of pluggable databases to the particular profile of the one or more of profiles;
  wherein the set of restrictions specified in the particular profile indicates a plurality of operations that users of the particular pluggable database are restricted from performing;
  detecting, by the container DBMS, a request to perform a particular operation whose execution is restricted by the particular restriction in the particular profile;
  in response to detecting the request, the container DBMS performing the steps of:
    determining that the request is for a particular user of the particular pluggable database;
    using the profile-to-pluggable-database mapping to determine that the particular profile is mapped to the particular pluggable database;
    determining, based on the set of restrictions specified in the particular profile, whether the particular operation is one of the plurality of operations that users of the particular pluggable database are restricted from performing; and
    based, at least in part, on determining that the particular operation is an operation that users of the particular pluggable database are restricted from performing, preventing execution of the particular operation.

2. The method of claim 1 wherein storing the one or more profiles is performed by storing the one or more profiles in the container database.

3. The method of claim 1 wherein storing the profile-to-pluggable-database mapping is performed by storing the profile-to-pluggable-database mapping in the container database.

4. The method of claim 1 wherein the particular profile includes a restriction that prohibits performance of one or more operations where identity is shared between pluggable databases.

5. The method of claim 1, wherein the particular restriction is the third restriction that prohibits users of any pluggable database that is mapped to the particular profile from performing the particular interaction that may affect the shared schema in the container database.

6. The method of claim 1 wherein the particular profile includes a restriction that prohibits performance of one or more operations related to database options.

7. The method of claim 1 wherein the particular profile includes a restriction that prohibits performance of one or more operations at SQL statement level in which a user of one pluggable database can affect other pluggable databases.

8. The method of claim 1 wherein the particular operation is an operation that the particular user has been explicitly granted privileges to perform, but is prevented from executing because of a restriction, within the particular profile, that is applicable to all users of the particular pluggable database.

9. The method of claim 1 wherein determining whether the particular operation is an operation that users of the particular pluggable database are restricted from performing includes using a restricted-command bitmap to determine whether the particular operation is an operation that users of the particular pluggable database are restricted from performing.

10. The method of claim 9 further comprising caching the restricted-command bitmap in volatile memory after determining whether the particular operation is restricted, and invalidating the restricted-command bitmap when the particular profile is updated.

11. The method of claim 1 wherein determining whether the particular operation is an operation that users of the particular pluggable database are restricted from performing includes: applying a hash function to a feature specified in the request to produce a hash value; and using the hash value to access a hash table to determine whether the particular operation is an operation that users of the particular pluggable database are restricted from performing.

12. The method of claim 11 further comprising caching the hash table in volatile memory after determining whether the particular operation is restricted, and invalidating the hash table when the particular profile is updated.

13. The method of claim 1 wherein the particular profile indicates that a certain type of command must always include a particular parameter value.

14. The method of claim 1 wherein the particular profile indicates that a particular OS user-id should be used when users of the particular pluggable database cause the container DBMS to make calls external to the container DBMS.

15. The method of claim 1 wherein the particular profile indicates a path restriction applicable to files created, external to the container DBMS, in response to commands issued by users of the particular pluggable database.

16. The method of claim 1 wherein the particular profile indicates a restriction that is applicable only to operations that involve a common object.

17. The method of claim 1 wherein the particular restriction is the second restriction that prohibits users of any pluggable database that is mapped to the particular profile from performing the particular interaction with the network.

18. The method of claim 1 wherein the particular profile indicates a user-specific exemption for at least one user of the particular pluggable database.

19. The method of claim 1 wherein the user-specific exemption is applicable to a single restriction within the particular profile.

20. One of more non-transitory computer-readable media storing instructions which, when executed by one or more processors, cause:
sharing hardware resources between a plurality of pluggable databases, each of which is contained in a container database managed by a container DBMS, wherein the plurality of pluggable databases have respective transportable collections of database dictionaries;
storing one or more profiles in a root database of the container database, wherein the root database is not one of the plurality of pluggable databases;
wherein each profile of the one or more profiles specifies a corresponding set of restrictions;
storing profile-to-pluggable-database mapping information in the root database;
wherein the set of restrictions that correspond to each profile includes access restrictions that apply to any pluggable databases that are mapped to the profile;
wherein the profile-to-pluggable-database mapping information maps a particular pluggable database of the plurality of pluggable databases to a particular profile of the one or more of profiles;
wherein the set of restrictions specified in the particular profile indicates a plurality of operations that users of the particular pluggable database are restricted from performing;
wherein a particular profile of the one or more profiles includes a particular restriction that is one of:
a first restriction that prohibits users of any pluggable database that is mapped to the particular profile from performing a particular interaction that would result in interaction between the container DBMS and an operating system;
a second restriction that prohibits users of any pluggable database that is mapped to the particular profile from performing a particular interaction with a network; or
a third restriction that prohibits users of any pluggable database that is mapped to the particular profile from performing a particular interaction that involves a common object in the container database;
detecting, by the container DBMS, a request to perform a particular operation whose execution is restricted by the particular restriction in the particular profile;
in response to detecting the request, the container DBMS performing the steps of:
determining that the request is for a particular user of the particular pluggable database;
using the profile-to-pluggable-database mapping to determine that the particular profile is mapped to the particular pluggable database;
determining, based on the set of restrictions specified in the particular profile, whether the particular operation is an operation that users of the particular pluggable database are restricted from performing; and
based, at least in part, on determining that the particular operation is one of the plurality of operations that users of the particular pluggable database are restricted from performing, preventing execution of the particular operation.

21. The one of more non-transitory computer-readable media of claim 20 wherein the particular operation is an operation that the particular user has been explicitly granted privileges to perform, but is prevented from executing because of a restriction, within the particular profile, that is applicable to all users of the particular pluggable database.

22. The one of more non-transitory computer-readable media of claim 20 wherein determining whether the particular operation is an operation that users of the particular pluggable database are restricted from performing includes using a restricted-command bitmap to determine whether the particular operation is an operation that users of the particular pluggable database are restricted from performing.

23. The one of more non-transitory computer-readable media of claim 20 wherein determining whether the particular operation is an operation that users of the particular pluggable database are restricted from performing includes: applying a hash function to a feature specified in the request to produce a hash value; and using the hash value to access a hash table to determine whether the particular operation is an operation that users of the particular pluggable database are restricted from performing.

24. The one of more non-transitory computer-readable media of claim 20 wherein the particular profile indicates that a certain type of command must always include a particular parameter value.

25. The one of more non-transitory computer-readable media of claim 20 wherein the particular profile indicates that a particular OS user-id should be used when users of the particular pluggable database cause the container DBMS to make calls external to the container DBMS.

26. The one of more non-transitory computer-readable media of claim 20 wherein the particular profile indicates a path restriction applicable to files created, external to the container DBMS, in response to commands issued by users of the particular pluggable database.

27. The one or more non-transitory computer-readable media of claim 20 wherein the particular restriction is the third restriction that prohibits user of any pluggable database that is mapped to the particular profile from performing a particular interaction that involves the common object.

28. The one or more non-transitory computer-readable media of claim 20 wherein the particular restriction is the second restriction that prevents users of any pluggable database that is mapped to the particular profile from performing a particular interaction with the network.

29. The one of more non-transitory computer-readable media of claim 20 wherein the particular profile indicates a user-specific exemption for at least one user of the particular pluggable database.

30. The one of more non-transitory computer-readable media of claim 20 wherein the particular restriction is the first restriction that prohibits users of any pluggable database that is mapped to the particular profile from performing a particular interaction that would result in interaction between the container DBMS and the operating system.

31. The method of claim 1 wherein the particular restriction is the first restriction that prohibits users of any pluggable database that is mapped to the particular profile from performing the particular interaction that would result in interaction between the container DBMS and an operating system, and wherein the interaction between the container DBMS and the operating system assigns an identity to the container DBMS that is shared by the plurality of pluggable databases.

* * * * *

UNITED STATES PATENT AND TRADEMARK OFFICE
CERTIFICATE OF CORRECTION

PATENT NO. : 10,733,316 B2
APPLICATION NO. : 15/244395
DATED : August 4, 2020
INVENTOR(S) : Shanthaveerappa et al.

Page 1 of 1

It is certified that error appears in the above-identified patent and that said Letters Patent is hereby corrected as shown below:

In the Claims

In Column 18, Line 4, in Claim 20, delete "of" and insert -- or --, therefor.

In Column 18, Line 66, in Claim 21, delete "of" and insert -- or --, therefor.

In Column 19, Line 5, in Claim 22, delete "of" and insert -- or --, therefor.

In Column 19, Line 12, in Claim 23, delete "of" and insert -- or --, therefor.

In Column 19, Line 21, in Claim 24, delete "of" and insert -- or --, therefor.

In Column 19, Line 25, in Claim 25, delete "of" and insert -- or --, therefor.

In Column 19, Line 30, in Claim 26, delete "of" and insert -- or --, therefor.

In Column 20, Line 5, in Claim 27, delete "user" and insert -- users --, therefor.

In Column 20, Line 13, in Claim 29, delete "of" and insert -- or --, therefor.

In Column 20, Line 17, in Claim 30, delete "of" and insert -- or --, therefor.

Signed and Sealed this
Twenty-seventh Day of April, 2021

Drew Hirshfeld
*Performing the Functions and Duties of the
Under Secretary of Commerce for Intellectual Property and
Director of the United States Patent and Trademark Office*